April 8, 1958

A. G. BURNS ET AL 2,829,724

VEHICLE AUXILIARY DRIVE

Filed May 3, 1954

INVENTORS.
Alvin G. Burns,
Hubert J. McAulay,
By Davis, Lindsey, Hibben & Noyes Atty's.

April 8, 1958

A. G. BURNS ET AL 2,829,724

VEHICLE AUXILIARY DRIVE

Filed May 3, 1954

INVENTORS.
Alvin G. Burns,
Hubert J. McAulay,
By Davis, Lindsey, Hibben & Noyes
Attys April 8, 1958 A. G. BURNS ET AL 2,829,724
VEHICLE AUXILIARY DRIVE
Filed May 3, 1954 6 Sheets-Sheet 5

INVENTORS.
Alvin G. Burns,
Hubert J. McAulay,
By Davis, Lindsey, Hatten & Noyes
Atty's.

United States Patent Office 2,829,724
Patented Apr. 8, 1958

2,829,724

VEHICLE AUXILIARY DRIVE

Alvin G. Burns and Hubert J. McAulay, Tulsa, Okla., assignors, by mesne assignments, to Unit Rig & Equipment Co., Tulsa, Okla., a corporation of Delaware Application May 3, 1954, Serial No. 427,148

33 Claims. (Cl. 180—53)

This application is a continuation-in-part of our co-pending application Serial No. 315,373 filed October 17, 1952, now abandoned.

The invention relates generally to vehicle drives and more particularly to a drive for a tractor.

The general object of the invention is to provide a novel auxiliary drive for a vehicle whereby the vehicle may be operated at variable speeds similar to those at which it is normally operated or at speeds differing from such normal speeds.

Another object is to provide a novel drive of the foregoing character, which may be readily mounted on a standard vehicle to modify the normal drive thereof.

A further object is to provide a novel drive for a vehicle adapted to modify the normal drive of the vehicle in such a manner as to provide vehicle speeds suitable for the operation of mechanisms carried or towed by the vehicle.

Still another object is to provide a novel drive for modifying the normal drive of the vehicle to operate it at speeds suitable for the operation of mechanisms carried or towed by the vehicle, the drive also having connections for operating such mechanisms.

A still further object is to provide a novel drive for modifying the normal drive of the vehicle to operate it at speeds suitable for the operation of mechanism carried or towed by the vehicle, the drive being of such character that no damage to the drive will result from stalling of the vehicle by obstructions encountered by such a mechanism.

Other objects and advantages will become apparent from the following description taken in connection with the accompanying drawings, in which.

Motor vehicles are frequently used to carry or tow mechanisms of a wide variety of types and to supply power for operating such mechanisms. Where the mechanism carried or towed by the vehicle is of large size and has substantial power requirements, the vehicle usually is a tractor and preferably a tractor of the type having traction elements in the form of an endless track. A tractor of this type has an internal combustion engine as its source of power, and the engine is connected to the traction elements through a transmission providing for variable speed ratios.

As mentioned above, the mechanisms towed or carried by the tractor may be of a wide variety of types, and the speeds at which it is desirable to operate them may, with some types, be similar to the speeds normally obtained by the usual transmission of the tractor. For other types of mechanisms, the speed of operation may differ substantially from that obtainable by the ordinary transmission and in quite a few instances the desirable speed for the transmission is substantially less than the normal slow speed operation of the tractor obtainable through the standard transmission therein.

We have therefore devised an auxiliary drive for a motor vehicle and particularly for a tractor of this type, which provides for operation of the tractor at speeds normally obtained through the transmission of the vehicle and also at speeds differing therefrom, particularly at slower speeds. Not only does the drive disclosed herein have the foregoing feature but it also is arranged to supply power to the mechanism for operating parts thereof, the amount of power and the speed of operation being adapted for the particular part of the mechanism being operated thereby.

The normal transmission for a tractor of this type provides a purely mechanical drive between the engine and the tractor elements, utilizing a clutch to connect the engine with the transmission. Should an obstruction be encountered either by the tractor, or particularly by the mechanism moved thereby, of sufficient extent to stall forward movement, either the clutch in the tractor would have to slip or some part in the tractor drive would shear. With some of the types of mechanisms moved by the tractor, such obstructions are frequently encountered. The auxiliary drive herein disclosed is therefore of a type which may be stalled without requiring the slippage of a clutch or the danger of shearing some part of the drive.

The drive herein disclosed is particularly adapted for use with mechanisms moved by the tractor, such as ditch digging machines, pipe laying machines, back-filling machines, snow removers, movable road material mixers, railroad ballast cleaners, machines for loading material taken from a stock pile, and many other auxiliary mechanisms. By way of example, we have herein shown the tractor as being associated with a ditch digging machine. In this instance, the ditching machine is of a character which is carried solely by the tractor. However, the drive of course is equally well suited for operating mechanisms which are mounted on their own rolling elements and are merely towed by the tractor.

Figure 1:
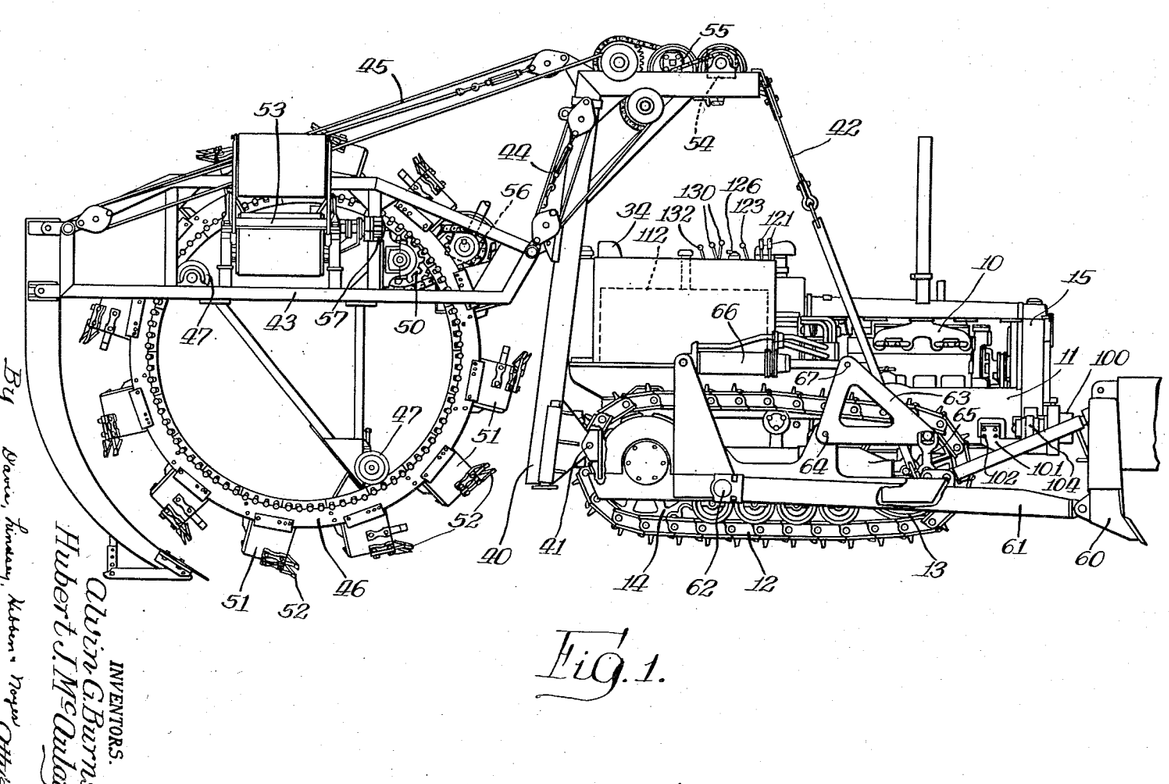
Fig. 1 is a side elevational view of the right-hand side of a motor vehicle having an auxiliary drive embodying the features of the invention, the vehicle being shown as carrying a mechanism which is operated from the drive.

To illustrate one embodiment of the invention, there is shown in Fig. 1 a tractor of the type heretofore mentioned and comprising an engine 10 carried on a frame structure 11, the latter being supported on the ground by endless tracks 12 on the respective sides thereof. Each track 12 is carried by an idler sprocket 13 near the front of the vehicle and a drive sprocket 14 at the rear of the vehicle, the sprocket being mounted on side portions of the frame structure 11. The engine is of the internal combustion type and is provided as usual with a radiator 15 for cooling purposes, preferably mounted on the front end of the frame 11 in front of the engine 10. The drive 10 drives the traction elements through a transmission or change speed mechanism indicated generally at 16 (see Fig. 2), the transmission being adapted to be connected to the engine by a main clutch indicated at 17.

The transmission is of a standard type and comprises a driven shaft 20 connected to the clutch 17 by a coupling 21. The driven shaft 20 carries a gear 22 constantly meshing with a larger gear 23 on a transmission shaft or countershaft 24. The transmission also includes a drive shaft 25 carrying a bevel pinion 26 on its rear end for driving a bevel gear adapted to be connected in driving relation with the drive sprockets 14 on opposite sides of the tractor. The drive shaft 25 is aligned with the driven shaft 20 and may be connected thereto by a sliding clutch means 27 for direct drive thereby. The drive shaft 25 may also be driven from the shaft 20 through various change speed gears mounted on the drive shaft 25 and the countershaft 24 for forward movement and for reverse or rearward movement through gears mounted on the shafts 24 and 25 and jointly meshing with an idler gear at one side thereof. The various gears on the drive shaft 25 are adapted to be shifted into mesh with gears on the countershaft 24, or with the idler gear mentioned above, by a gear shift lever 28.

The foregoing transmission is well known in the art and is commonly employed in vehicles of the character herein contemplated and need not be more fully described. However, tractors of this type are usually provided with a power take-off shaft adapted to be driven by the engine for supplying power mechanically to auxiliary apparatus. In the present instance, the countershaft 24 is extended rearwardly as at 30 and an opening 31 is provided in the rear of the transmission casing to provide for connection of such auxiliary apparatus with the extension 30 which thus constitutes a power take-off shaft in this instance. The opening 31 in the transmission casing is normally closed by a cover which is readily removable when the driving connection between the auxiliary apparatus and the power take-off shaft 30 is to be made. The particular change speed gearing herein disclosed is of a type which provides for five forward speeds and one reverse.

In one model of tractor of this type made by a certain manufacturer, the normal engine speed for continuous operation is 1400 R. P. M., and the change speed gearing in the transmission is such that at first or low speed the road speed of the vehicle is 1.70 miles per hour or 149.6 feet per minute. At fifth or high speed, the road speed of the vehicle, with the engine operating at 1400 R. P. M., is 5.38 miles per hour or 473.5 feet per minute. The other speeds lie in between these limits. In reverse, the vehicle is operated at a road speed of 1.91 miles per hour or 167.5 feet per minute.

Figure 2:
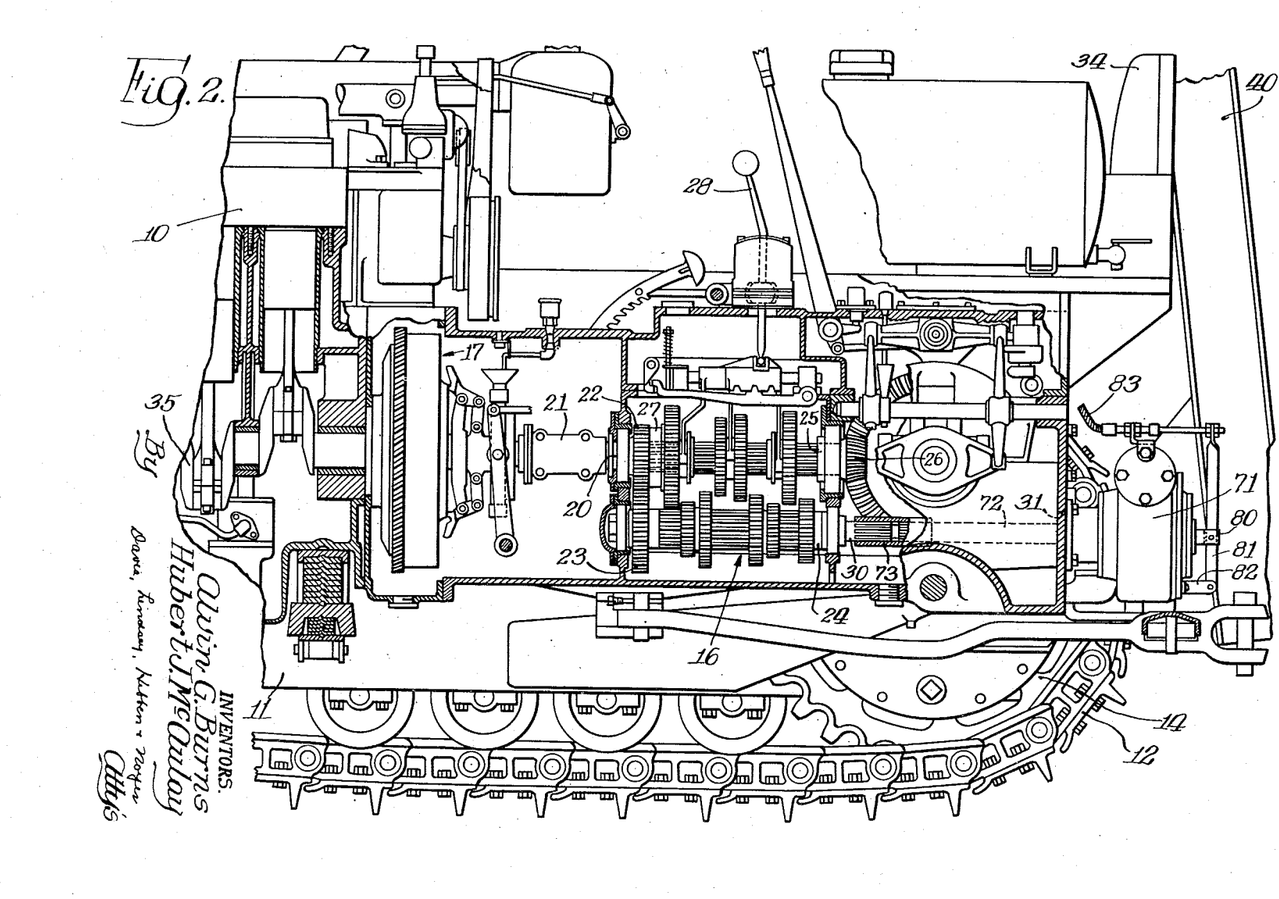
Fig. 2 is a fragmentary side elevational view of the left-hand side of the vehicle, partially in section, and showing the manner in which the auxiliary drive is connected to the vehicle.

The main clutch 17 which connects the engine to the transmission 16 is adapted to be engaged and disengaged by a system of levers and links (see Fig. 3), including a link 32 connected to a hand lever 33 located adjacent the gear shift lever 28. The clutch lever 33 and the gear shift lever 28 are mounted adjacent to a seat 34 for the operator of the vehicle. The crankshaft of the engine, indicated at 35 in Fig. 2, is connected at its rear end to the clutch 17, and its front end is accessible below the radiator 15.

As mentioned heretofore, the ditch digging machine is illustrated in the drawings as an example of a mechanism moved by the tractor. Thus, in Fig. 1 there is shown such a mechanism which comprises generally a vertically extending frame structure 40 secured at its lower end to the tractor as at 41 and having the upper portion thereof anchored to the tractor frame 11 by means of tie rods 42. Mounted for vertical movement on the frame structure 40 is a carrier frame 43 which is adapted to be moved vertically by means of a front hoist 44 and a rear hoist 45. Rotatably mounted in the carrier frame 43 is a digging wheel 46 supported by a pair of idler rollers 47 and a drive sprocket 50. On the periphery of the digging wheel 46 are mounted a plurality of buckets 51 provided with teeth 52 at their forward edge. The digging wheel is adapted to be rotated counterclockwise, as shown in Fig. 1, as the tractor moves forward, to dig a ditch, the earth being removed by the buckets 51 and dumped into conveyor 53 when the respective buckets reach a position at the top of the wheel. The conveyor 53 extends transversely of the direction of travel of the tractor and carries the earth dumped thereon off to one side of the ditch. The conveyor may be operated in either direction so that the removed earth may be deposited on either side of the ditch as desired. In operation, the carrier frame 43 is gradually lowered by the hoists 44 and 45 to dig a ditch of the required depth. When the carrier frame 43 has been lowered to the desired extent, it is held at such position while the tractor moves forward, although of course the depth may be changed whenever desired by operation of the hoists. At the conclusion of the digging, the hoists are operated to raise the carrier frame 43 to a point where the digging wheel clears ground over which the tractor travels.

With a ditching machine of this character, there are a number of parts thereof that require power drives. Because of the fact that obstructions may be encountered in operation of these parts, it is desirable to provide drives which will merely stall when the load becomes too great, without causing breakage of any of the driving parts. For this reason, it is preferable that the source of power for the various drives be hydraulic motors each of which is provided with a maximum pressure release for the pressure fluid supplied thereto. The fluid pressure is thus released below the point at which any of the parts of the drive might shear. Thus, when an obstruction is encountered, the drive will merely stall and the hydraulic motors can merely be reversed and then started forward in another attempt to break through the obstruction.

In the present instance, because of the weight of the parts supported by the carrier frame 43, the hoists 44 and 45 are power-operated. To this end, a hydraulic motor 54 is mounted on the upper part of the frame structure 40 to operate the front hoist 44, and another hydraulic motor 55 is mounted on the upper part of the frame structure 40 to operate the rear hoist 45. These motors are reversible so that the carrier frame may be moved up and down. Moreover, the two motors 54 and 55 are operable independently of each other so that the rear end of the carrier frame 43 may be raised higher than the front end to assist in bringing the digging wheel and its buckets above the ground level. To rotate the digging wheel 46, a hydraulic motor 56 is mounted on the carrier frame 43 and through gearing drives the sprocket 50 to rotate the digging wheel with its buckets. The conveyor is operated by means of a pair of hydraulic motors 57 mounted on the carrier frame 43 at each side thereof, one being shown in Fig. 1.

The tractor may also be equipped with a bulldozer 60 mounted on its front end to fill in the ditch dug by the ditching machine, after work in the ditch has been completed, such as laying pipe therein. In the present instance, the bulldozer is shown as being supported by a pair of arms 61 extending rearwardly along the sides of the tractor and pivotally supported at their rear ends at 62 on side portions of the frame structure 11. To raise and lower the bulldozer 60, bell cranks 63 are pivotally supported at 64 on the frame structure 11 and are attached by links 65 at their front ends to the arms 61. To actuate the bell cranks 63, a pair of hydraulic actuators 66 of the piston and cylinder type are mounted on opposite sides of the machine and are connected at 67 to the upper parts of the bell cranks. Thus, by operation of the actuators 66, the bulldozer 60 may be raised and lowered by a swinging movement about the pivots 62.

From the foregoing description, it will be evident that the tractor is adapted to carry mechanism such as the digging machine illustrated in Fig. 1 while the latter is operating.

To operate the various hydraulic motors constituting a part of the ditching machine, a source of fluid under pressure is provided which constitutes a part of the novel drive structure embodying the invention. While the mechanism moved by the tractor may be, in some instances, such that it can operate at the normal road speeds provided by the tractor, in other instances such normal road speeds are not proper for the operation of the mechanism. In the present instance, the ditching machine is normally operated at forward speeds substantially less than those obtainable by the normal tractor drive. For that reason an auxiliary drive, embodying the features of the invention, is provided to operate the tractor at speeds suitable for the mechanism moved thereby. In the present instance, the auxiliary drive is adapted to move the tractor at speeds substantially less than those obtainable through the normal gear ratios provided by the transmission 16.

Moreover, an auxiliary drive embodying the features of the invention utilizes a hydraulic motor to operate the tractor so that, should the ditching machine encounter an obstruction, forward movement of the tractor will be stalled but no undue stresses will be placed on any of the parts of the tractor because of the maximum pressure release provided in the hydraulic motor drive. The auxiliary drive herein disclosed also includes pumping means for supplying fluid under pressure not only to the hydraulic motor for operating the tractor but also to the various hydraulic motors for operating the parts of the ditching machine and to the hydraulic actuators 66 for operating the bulldozer 60.

The hydraulic motor constituting a part of the auxiliary drive for the tractor is adapted to be connected to the tractor in such a manner that the change speed gearing in the transmission 16 may be utilized to provide various speeds of travel of the tractor and for reverse operation thereof. To this end, the hydraulic motor of the auxiliary drive is connected to the power take-off shaft 30 of the transmission 16 and thus can drive the traction elements of the tractor through the change speed gearing provided by the transmission 16.

Figures 3, 7:
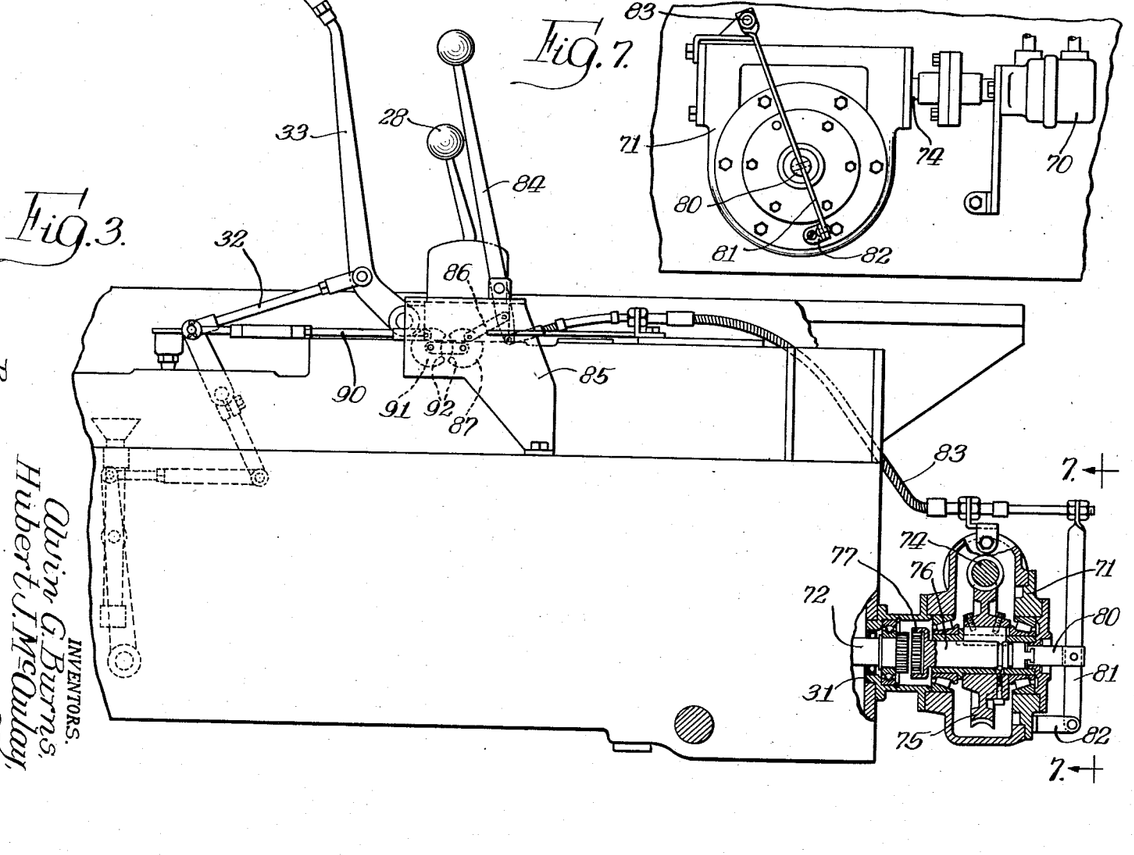
Fig. 3 is a side elevational view of a portion of the vehicle and an auxiliary drive in section, showing an interlock between certain controls for the vehicle and the auxiliary drive.
Fig. 7 is a fragmentary rear elevational view of the auxiliary drive as viewed from the line 7—7 of Fig. 3.
Figure 5:
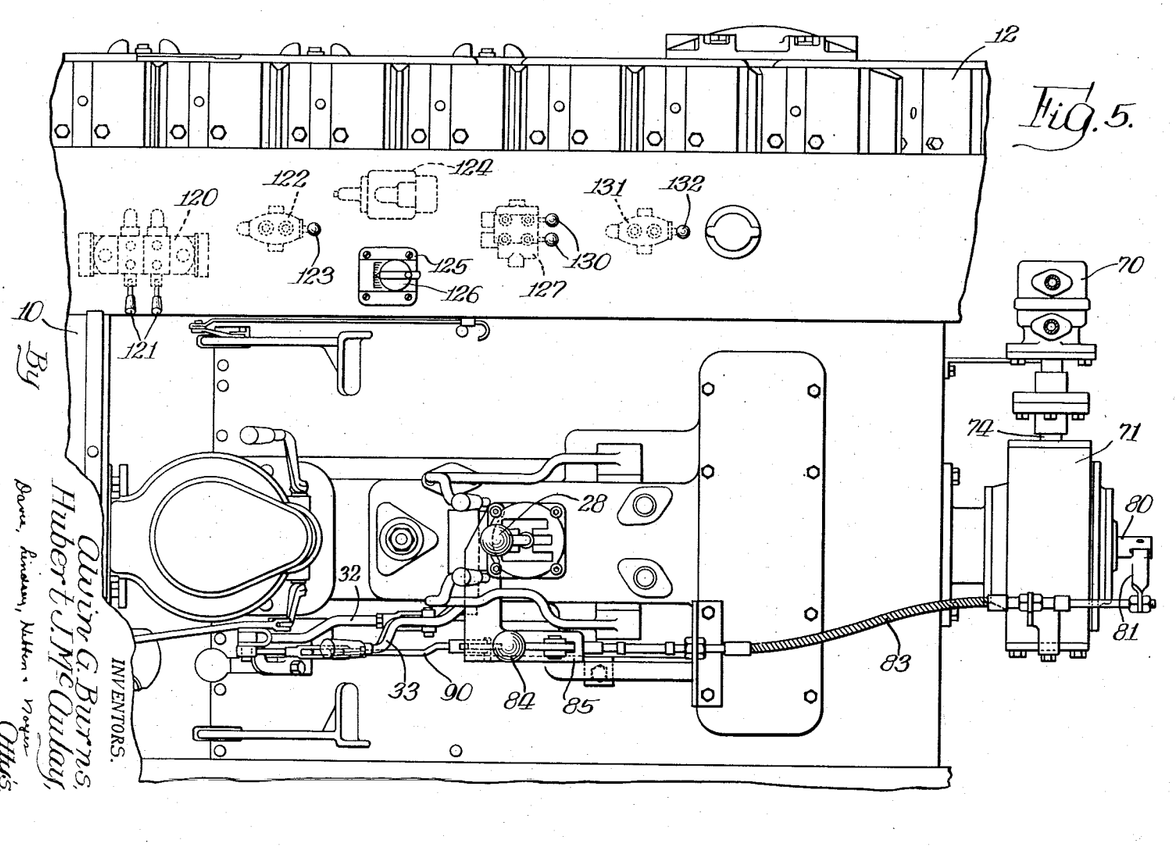
Fig. 5 is a fragmentary plan view of the vehicle and showing various controls for the vehicle and the drive as well as for the mechanism carried by the vehicle.
Figure 6:
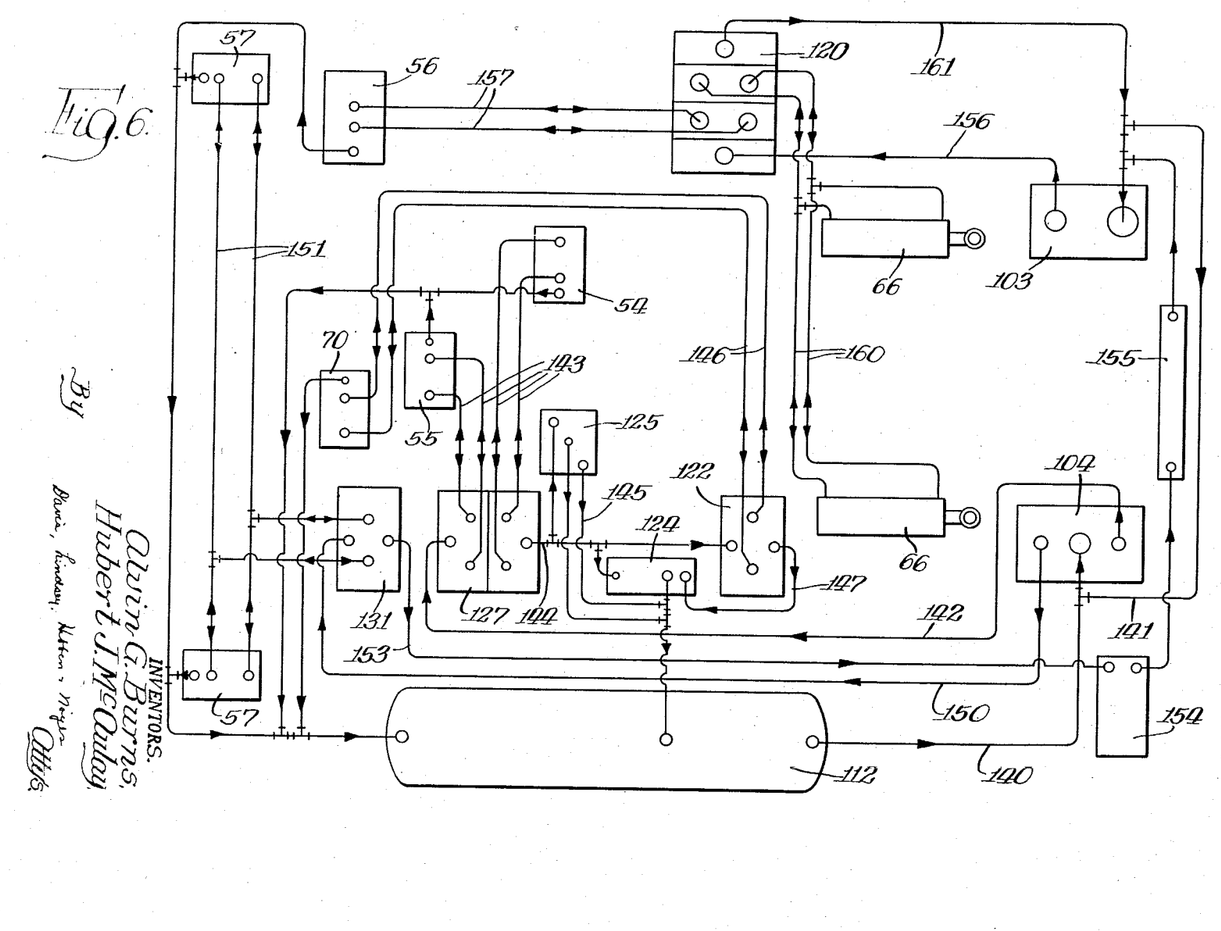
Fig. 6 is a diagrammatic view showing connections for operating the auxiliary drive and the mechanism carried by the vehicle.

In the embodiment of the invention disclosed herein, a hydraulic motor 70 is provided (see Figs. 5, 6 and 7). The motor 70 is adapted to be connected to drive a gear reduction unit 71 shown also in Figs. 2 and 3. The gear reduction unit 71 is adapted to be mounted on the rear face of the transmission casing over the opening 31 in place of the cover which normally closes the opening, and is provided with a drive shaft 72 adapted to extend through the opening 31 into the transmission casing for connection with the power take-off shaft 30 by a coupling 73. In the present instance, the gear reduction unit 71 comprises a worm shaft 74 connected to the motor 70 and driving a worm gear wheel 75. The wheel 75 is carried on a drive shaft 76 which is slidably mounted within the wheel 75 and is provided with clutch means 77 on its forward end, adapted to engage the drive shaft 72. The shaft 76 is adapted to be moved to engage and disengage the clutch 77 by means of a link 80 connected to the rear end of the shaft and operated by a lever 81 pivotally supported by a bracket 82 mounted on the casing of the gear reduction unit 71. By means of the clutch 77, the drive effected by the motor 70 may be connected and disconnected from the power take-off shaft 30

To shift the clutch 77, the lever 81 is shown as being connected to a Bowden wire 83 which extends upwardly over the casing of the transmission 16 to a clutch lever 84 (see Fig. 3) pivotally mounted on a bracket 85 adapted to be secured to the transmission casing. The clutch lever 84 thus is mounted adjacent the gear shift lever 28 and the main clutch lever 33 so that it is readily accessible to the operator of the tractor.

It would of course be undesirable to have both the main clutch 17 and the clutch 77 engaged at the same time. The invention therefore includes an interlock between these two clutches, which prevents simultaneous engagement of both of the clutches. To this end, the clutch lever 84 is provided with a link 86 adapted to rotate an interlock disk 87 rotatably mounted on the bracket 85. Connected to the front end of the link 32 which connects the main clutch lever 33 with the main clutch 17, is a link 90 extending rearwardly and connected to rotate a second interlock disk 91 mounted on the bracket 85 adjacent the interlock disk 87. The two disks 87 and 91 are provided with cut-out portions 92 which have to be properly positioned in order to permit either of the disks to be rotated by movement of the hand lever connected thereto. Thus, in the position shown in Fig. 3, the interlock disk may be rotated into the cut-out portion 92 of the disk 91 to permit operation of the hand lever 84 and engagement of the clutch 77. When the disk 87 is so rotated, the disk 91 cannot be rotated, so that the main clutch cannot then be engaged. When the clutch 77 is disengaged, and the disk 87 is in the position shown in Fig. 3, the disk 91 may be rotated by movement of the main clutch lever 33 and the main clutch may then be engaged. However, rotation of the disk 91 from the position shown prevents rotation of the disk 87 so that the clutch 77 cannot then be engaged. An interlock is thus provided between the main clutch 17 and the clutch 77 for the auxiliary drive, which prevents engagement of both clutches at the same time.

With the motor 70 of the auxiliary drive connected to the power take-off shaft 30 through the gear reduction unit 71, the countershaft 24 of the transmission 16 is thereby driven. Consequently the traction elements of the tractor may be driven in a forward direction through the various change speed gears mounted on the countershaft 24 and the drive shaft 25. It is also capable of operating the tractor rearwardly through the reverse gearing provided in the transmission. Thus, the speed of movement of the tractor by the auxiliary drive is determined by the speed of operation of the hydraulic motor 70 and the particular speed ratio selected by the gearshift lever 28 of the transmission 16.

With the particular hydraulic motor 70 herein disclosed and the gear reduction unit 71, forward speeds of movement of the tractor, which are much lower than those obtainable through the normal tractor drive, may be obtained. Thus, even with the engine and hydraulic motor 70 operating at maximum speed, speeds as low as 8.34 feet per minute in first or low gear to 29.78 feet per minute in fifth or high gear are obtainable. The exact speed of course depends upon the speed at which the engine of the tractor is operated and the efficiency of the motor 70 and the pump for supplying it with pressure fluid. Still lower speeds than those just mentioned may be obtained by controlling the flow of pressure fluid to the motor 70. Thus, a flow control valve, as hereinafter described, may be provided in the line supplying pressure fluid to the motor 70 to bleed off some of the fluid therefrom and thus reduce the flow to the motor. This of course results in slower operation of the motor 70 and hence the speed of the tractor. As a practical matter, a tractor speed as low as .33 feet per minute through the low gear of the transmission 16 may be obtained in this manner. The same control of the speed of operation of the motor 70 by the flow control valve is of course available when the motor 70 is driving the tractor through the other gears of the transmission 16.

Thus practically any tractor speed from .33 feet per minute to 29.78 feet per minute may be obtained by utilizing the motor 70.

For reverse operation, with the engine and motor 70 operating at maximum speed the tractor may be operated at speeds on the order of 9.33 feet per minute when the reverse gearing of transmission 16 is utilized. However, since the motor 70 is of the reversible type, the tractor may be operated reversely merely by reversing the motor 70, which avoids the necessity of utilizing the reverse gearing of the transmission. With such reverse operation, all the various change speed gears of the transmission are available for reverse operation of the tractor and the speed of the motor may be varied by the flow control valve. Thus, the tractor may be driven either forward or in reverse through the same range of speeds.

It is apparent that these speeds are much lower than the speeds obtainable through the transmission 16 when connected to the engine by the clutch 17, but these lower speeds are those that are suitable for operation of the digging machine illustrated in Fig. 1. By reducing the speed of movement of the tractor by means of the auxiliary drive, the engine of the tractor may be operated at its most efficient speed.

To provide fluid under pressure for operating the motor 70, as well as for operating the various motors in the digging machine and the hydraulic actuators for the bulldozer, a pumping means is provided as a part of the auxiliary drive, which pumping means is adapted to be mounted so that it has a direct connection with the engine of the tractor. Since in a tractor of the type herein disclosed, the front end of the chankshaft 35 is accessible below the radiator 15, the pumping means provided is adapted to be mounted on the tractor frame 11 in front of the radiator 15 so that it may be readily connected to the crankshaft 35. The pumping means preferably comprises a plurality of pumps so that fluid at different pressures is available for operating the various hydraulic motors, and the pumps are adapted to be driven through a connection with the front end of the crankshaft 35.

In the present instance, the pumping means comprises a housing 100 (see Figs. 1 and 4) located in front of the radiator 15. The housing 100 extends crosswise of the tractor and is adapted to be supported by the tractor frame 11 by means of a pair of arms 101 extending rearwardly from the housing 100 and secured to the sides of the frame 11 as by bolts 102. The housing 100 carries pumps at the respective ends thereof, which preferably extend rearwardly from the housing at the respective sides of the radiator 15. In the present instance, a single pump 103 is provided at the left side of the tractor and a double pump 104 at the right side of the tractor. The pumps 103 and 104 are of the rotary type and are adapted to be driven by drive connections within the housing 100. Thus, we provide a shaft adapted to be connected to the front end of the crankshaft 35 and carrying a pair of sprockets 105. The rear sprocket 105 is connected by a chain 106 to a sprocket 107 driving the shaft of the pump 103 while the front sprocket 105 is connected by a chain 110 to a sprocket 111 driving the shaft of the double pump 104.

The pumps 103 and 104 will thus be continuously driven by the engine of the tractor and when the auxiliary drive is utilized to operate the tractor, the engine speed may be kept at the most efficient rate for operation of the engine, with the speed of the vehicle controlled by the controls provided for the pump 70 and the change speed gearing in the transmission 16.

In the arrangement of the various hydraulic circuits for connecting the pumps with the various hydraulic motors, the pump 103 on the left side of the tractor is arranged to supply pressure fluid for the digging wheel motor 56 and for the bulldozer actuators 66. With the pump 104, which is a double pump, the front section thereof is utilized to operate the two hoist motors 54 and 55 and the motor 70 of the auxiliary drive which is adapted to operate the tractor. The rear section of the pump 104 supplies pressure fluid for operating the two conveyor motors 57. The pumps 103 and 104 draw fluid from a tank 112 which is preferably located on the tractor at the right side thereof within a casing adjacent the operator's seat 34. Suitable controls are of course provided for the various motors and such controls in the present instance are mounted within the casing which encloses the tank 112, thus placing them in a position where they are readily accessible to the operator of the tractor.

The controls are of course connected to the pumps and motors and are also connected to the tank 112 by suitable conduits which are not been shown in detail herein but are shown diagrammatically in Fig. 6. Thus, as illustrated in Figs. 1 and 5, the controls include a double valve unit 120 having a pair of control levers 121 respectively arranged to control the flow of pressure fluid to the digging wheel motor 56 and to the hydraulic actuators 66 for the bulldozer. A hand-operated valve 122 having a handle 123 is mounted to the rear of the double valve 120 to control the flow of pressure fluid to the motor 70 of the auxiliary drive. To the rear of the valve 122 is mounted an unloading valve 124 and a flow control valve 125 having a manually settable part 126. To the rear of these valves is mounted a double valve 127 having a pair of handles 130 for controlling the flow of pressure fluid to the two hoist motors 54 and 55. To the rear of the last mentioned valve is another hand-controlled valve 131 having a handle 132 for controlling the flow of pressure fluid to the two conveyor motors 57. The various valves just mentioned are mounted within the casing enclosing the tank 112 and the handle portions thereof project above the casing so that they are readily accessible to the tractor operator and are close to the various tractor control levers.

To describe the various conduits for the fluid for the various motors, the connections are shown diagrammatically in Fig. 6. Thus, a line 140 extends from the tank 112 to the intake of the double pump 104. A line 141 branching off from the line 140 extends to the intake of the pump 103. As heretofore mentioned, the front section of the pump 104 supplies pressure fluid to the hoist motors 54 and 55 and to the motor 70 of the auxiliary drive. Thus, the outlet of the front section of the pump 104 is connected by a line 142 to the valve 127 controlling the flow of pressure fluid to and from the hoist motors 54 and 55. The valve 127 is of a type which is adapted to operate the motors in both directions and is connected to these two motors by the lines 143 for flow to and from these motors. The fluid discharged from the motors 54 and 55 through the valve 127 is carried by a line 144 having the flow control valve 125 connected thereto. The flow control valve is arranged to bleed pressure fluid from the line 144 and thus control the speed of the auxiliary drive motor 70. Thus, the valve 125 is provided with a line 145 connected to discharge by-passed fluid into the tank 112.

The line 144 extends to the valve 122 and the latter is connected by lines 146 with the auxiliary drive motor 70. The valve 122 is constructed so that pressure fluid may be supplied to the motor 70 for opposite directions of operation thereof, and fluid returned from the motor 70 is discharged through the valve 122. The valve 122 thus has a discharge line 147 which is connected to the unloading valve 124 and the latter is connected to discharge fluid into the tank 112. The unloading valve also is connected to the line 144. The unloading valve is set to open at about fifty pounds pressure to prevent the motor 70 from running away when the tractor is going down an inclined surface.

The rear section of the pump 104 is connected through a line 150 to the valve 131 for controlling the flow of pressure fluid to and from the conveyor motors 57. Thus, the valve 131 is connected to lines 151 leading to the two conveyor motors 57 and the valve 131 is of a type to effect operation of the conveyor motors in opposite directions with the discharge from the motors 57 returning through the valve 131. The latter is provided with a discharge line 153 connected to a filter 154 which in turn is connected to a radiator 155. The fluid discharged from the radiator 155 flows into the branch line 141 to enter the intake of the pump 103.

The pump 103 supplies the pressure fluid for operating the digging wheel motor 56 and the bulldozer actuators 66. Thus, the pump 103 is connected by a line 156 with the double valve 120. The latter is connected by lines 157 for the supply and return of fluid to and from the digging wheel motor 56. The valve 120 is also connected by lines 160 to the two bulldozer actuators 66 for operating them in opposite directions. The fluid returned from the bulldozer actuators 66 and the digging wheel motor 56 returns through the double valve 120 and is carried by a discharge line 161 which connects with the branch supply line 141 for the pump 103. Suitable bleed lines extending from all of the motors to the tank 112 are of course provided.

From the foregoing description of the hydraulic circuits, it will be seen that pressure fluid is supplied from the pumps to the various motors in the mechanism moved by the tractor as well as to the auxiliary drive motor 70. Pressure fluid is also available from the pump 103 for operating the bulldozer 60. The flow of pressure fluid to all of the motors is under the control of the various manually operable control valves which are located conveniently to the operator of the tractor.

The ditching machine shown herein is readily detachable from the tractor so that the tractor may be operated without the ditching machine or with other mechanism in place of the ditching machine. To detach the latter from the tractor, the tie rods 42 may be disconnected and the pivot pins 41 removed, thus disconnecting the frame 40 from the tractor. The various fluid pressure lines extending to the hydraulic motors of the ditching machine are preferably in the form of high pressure hose and are provided with self-sealing quickly detachable fittings so that the lines to the motors may thus be readily disconnected from the tractor. The ditching machine may thus be detached from the tractor when desired.

Figures 4, 8:
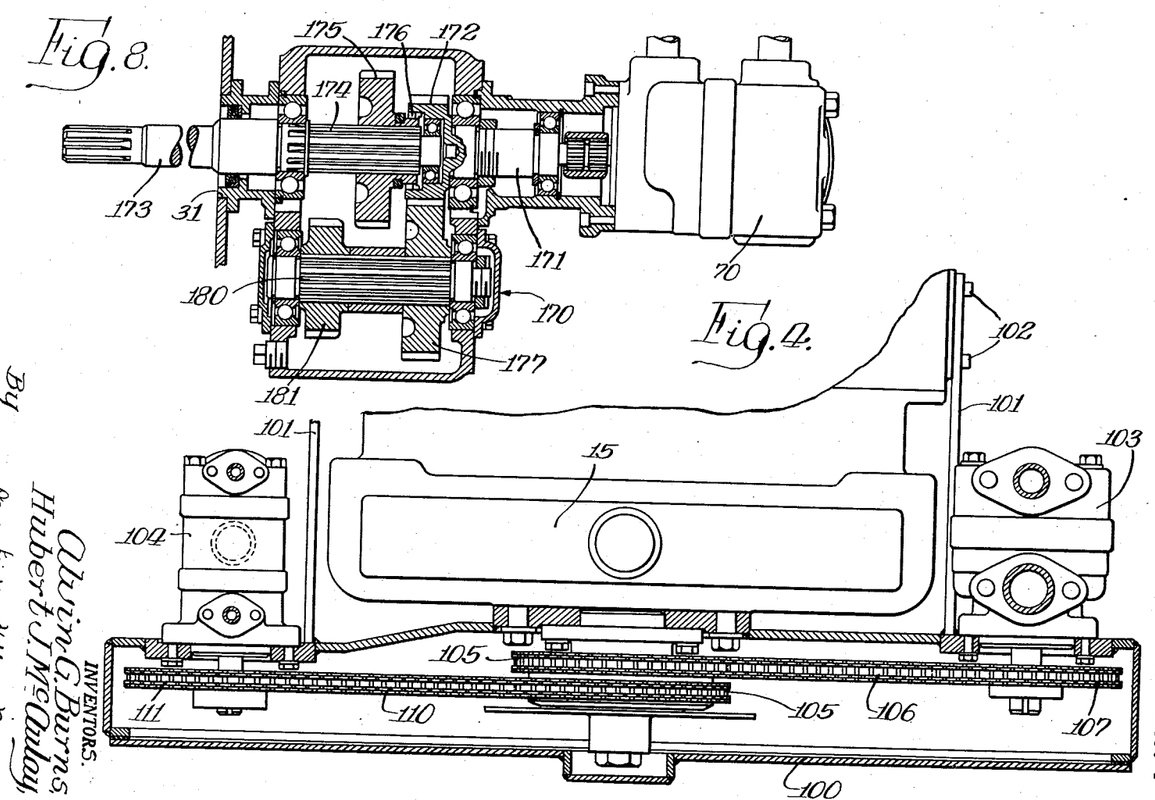
Fig. 4 is a fragmentary plan view of the vehicle with a portion of the drive mounted thereon and shown in section.
Fig. 8 is a view similar to Fig. 7 but partially in section and showing a modified form of auxiliary drive.

While the auxiliary drive motor 70 operating through the gear reduction unit 71 and the transmission 16 provides speeds of operation for the tractor, which are suitable for the ditching machine herein illustrated, the auxiliary drive illustrated in Fig. 8 provides for additional speed variations where such variations are found to be desirable for other mechanisms than the ditching machine. Thus, in Fig. 8 the auxiliary drive motor 70 is shown as connected to a gear reduction unit 170 provided with change speed mechanism interposed between the motor 70 and the connection of the gear reduction unit with the power take-off shaft 30. In the present instance the gear reduction unit 170 is shown as being capable of two different speed ratios each of which is capable of being varied by the change speed gearing in the transmission 16.

In the present instance, in Fig. 8, the motor 70 is shown as connected to a shaft 171 carrying a gear 172 at its end within the casing of the gear reduction unit 170. The unit also includes a driven shaft 173 adapted to be connected to the power take-off shaft 30 in the same manner as the shaft 72 in the first-described form. The shaft 173 at its end within the casing of the unit is splined as at 174 and carries a gear 175 slidably mounted thereon but fixed for rotation therewith by the splines. The shaft 173 is aligned with the shaft 171 and the two gears 172 and 175 mounted on the respective shafts are provided with interengaging clutch means 176. Thus, when the gear 175 is shifted toward the gear 172, the clutch means 176 is engaged and the shaft 173 is directly driven by the shaft 171. To change the speed ratio between the shaft 171 and the shaft 173, the gear 172 meshes with a second gear 177 carried on a countershaft 180. Also mounted on the countershaft is another gear 181. The gear 175 on the shaft 173 when shifted to disengage the clutch means 176 is thereby moved into mesh with the gear 181 so that the shaft 173 is thereby driven at a different speed ratio through the gears 172, 177, 181 and 175. While the means for shifting the gear 175 is not disclosed herein, it is obvious that any well-known type of shifting means may be employed. Such shifting means may be operated by a Bowden wire similar to the wire 83 and connected to be operated by the hand lever 84 with an interlock with the main clutch 17 so that the auxiliary drive and the drive through the clutch 17 cannot be engaged at the same time.

From the foregoing description, it will be apparent that we have provided a novel auxiliary drive for a vehicle which is adapted to operate the vehicle at variable speeds differing from the normal speeds provided by the transmission of the vehicle and also permitting the vehicle to be driven at its normal speeds through its usual drive connections. The auxiliary drive is of such a nature that it may be readily mounted on a standard vehicle. For example in the present instance where it is shown as being mounted on a tractor, the motor 70 with the gear reduction unit are mounted on the transmission casing, the pump means is mounted on the frame structure of the tractor adjacent the front end thereof, and the various controls are mounted in a casing provided at one side of the tractor. The speeds provided by the auxiliary drive are such as are suitable for forward movement of the mechanism moved by the vehicle. Thus, in the present instance where a digging maching is shown and the forward speeds are substantially less than those normally provided by a tractor, the auxiliary drive provides for forward operation at such reduced speeds. Since a hydraulic motor constitutes the driving unit of the auxiliary drive, the engaine of the vehicle may be operated at maximum efficiency while the speed of the vehicle is under the control of the control means for the hydraulic motor. The auxiliary drive also provides a source of power for operating the various parts of the mechanism moved by the tractor. One particular advantage obtained by the use of a hydraulic drive as part of the auxiliary drive for operating the various parts of the mechanism is that should any obstruction be encountered by such mechanism, the maximum pressure release for the various motors effectively prevents any damage thereto and the obstructions merely result in stalling of the vehicle.

We claim:

1. An auxiliary drive for attachment to a motor vehicle having an engine for operating traction elements and a transmission interposed between and connected to said engine and said elements, said drive comprising means separate from the aforesaid connection between the transmission and the engine and adapted to be connected to and driven by the engine for supplying power, means connected to receive power from said first-mentioned means, and a connection from said last-mentioned means for connecting said last-mentioned means to said transmission independently of the aforesaid connection between said transmission and engine.

2. An auxiliary drive for attachment to a motor vehicle having an engine, a transmission, a clutch for connecting said engine with said transmission, and traction elements driven by said transmission, said drive comprising means adapted to be connected to and driven by the engine for supplying power, a motor connected to receive power from said means, and a clutch for connecting said motor to said transmission to drive said traction elements.

3. An auxiliary drive for a motor vehicle having an engine, a transmission connected to the rear end of the engine to be driven thereby, and traction elements driven by said transmission, said drive comprising means adapted to be connected to the front end of and to be driven by the engine for supplying power, a motor connected to receive power from said means, and means for connecting said motor to said transmission to drive said traction elements.

4. An auxiliary drive for attachment to a motor vehicle having an engine, a transmission including a driven element adapted to be connected to said engine and a driving element, said elements being interconnected by change speed gearing of the type for changing the drive ratio between the driven and driving elements, and traction elements driven by said driving element, said drive comprising means adapted to be driven by the engine for supplying power, a motor connected to receive power from said means, and means for connecting said motor to said change speed gearing to drive said traction elements through said gearing when the transmission is disconnected from the engine.

5. An auxiliary drive for a motor vehicle having an engine, a transmission having an engine driven shaft, a countershaft driven thereby, a drive shaft and change speed gearing for selectively connecting the drive shaft with said countershaft and with said driven shaft for operation of said drive shaft at different speed ratios, and traction elements driven by said drive shaft, said drive comprising means adapted to be driven by the engine for supplying power, a motor connected to receive power from said means, and means for connecting said motor to said countershaft to drive said traction elements through said change speed gearing and said drive shaft when the transmission is disconnected from the engine.

6. An auxiliary drive for a motor vehicle having an engine, a transmission including a power take-off shaft, a clutch for connecting said transmission to said engine, and traction elements driven by said transmission, said drive comprising means adapted to be driven by the engine for supplying power, a motor connected to receive power from said means, a clutch for connecting said motor to said power take-off shaft to drive said traction elements, and an interlock connected to the last-mentioned clutch and adapted to be connected to the first-mentioned clutch and arranged to prevent engagement of the two clutches at the same time.

7. An auxiliary drive for a motor vehicle having an engine, a transmission including a power take-off shaft, a clutch for connecting said transmission to said engine, a manually operable lever for operating said clutch, and traction elements driven by said transmission, said drive comprising means adapted to be driven by the engine for supplying power, a motor connected to receive power from said means, a clutch for connecting said motor to said power take-off shaft to drive said traction elements, a manually operable lever for operating said last-mentioned clutch, and an interlock connected to said last-mentioned lever and adapted to be connected to said first-mentioned lever to present engagement of the two clutches at the same time.

8. An auxiliary drive for a tractor having an engine, a transmission mounted rearwardly of said engine and adapted to be connected to and driven by the crankshaft of said engine and including a rearwardly extending power take-off shaft, and traction elements driven by said transmission, said drive comprising means for supplying power adapted to be mounted on the front of the tractor and to be connected to the front end of the crankshaft to be driven thereby, a motor adapted to be mounted on the rear of the tractor and connected to receive power from said means, and means for connecting said motor to the rear end of said power take-off shaft to drive said traction elements when the transmission is disconnected from the engine.

9. In a motor vehicle having an engine and traction elements, a pair of drives for selectively driving said elements from said engine, one of said drives comprising a transmission comprising a driven shaft, a countershaft geared to said driven shaft, a drive shaft, and change speed gearing for selectively connecting said drive shaft with said countershaft and with said driven shaft, and a clutch for connecting said driven shaft to the engine, the other of said drives comprising a fluid pressure pump directly connected to said engine, a fluid pressure motor connected to receive pressure fluid from said pump, and a clutch for connecting said motor to said countershaft.

10. An auxiliary drive for operating a motor vehicle at speeds suitable for operation of a mechanism moved by the vehicle, said vehicle having an engine, a transmission adapted to be connected to and driven by the engine and including a power take-off shaft, and traction elements driven by said transmission, said drive comprising means adapted to be driven by the engine for supplying power, a motor connected to receive power from said means, means for connecting said motor to said power take-off shaft to drive said traction elements through said transmission when the transmission is disconnected from the engine, and connections extending from said first-mentioned means and adapted to be connected to said mechanism for operating the latter.

11. An auxiliary drive for operating a motor vehicle at speeds suitable for operation of a mechanism moved by the vehicle, said vehicle having an engine, a transmission adapted to be connected to and driven by the engine and including a power take-off shaft, and traction elements driven by said transmission, said drive comprising pump means adapted to be driven by the engine for supplying fluid under pressure, a fluid pressure motor connected to receive pressure fluid from said pump means, means for connecting said motor to said power take-off shaft to drive said traction elements through said transmission when the transmission is disconnected from the engine, a plurality of fluid pressure connections extending from said pump means for operating fluid pressure motors on said mechanism, and a plurality of control devices adapted to be mounted on the vehicle for controlling the flow of pressure fluid to all of said motors.

12. An auxiliary drive unit adapted to be mounted on a motor vehicle of the type having an engine for driving a transmission for driving traction elements, said transmission including a housing having an opening therein and also including a power take-off shaft mounted within said housing in alignment with said opening, said drive unit comprising a hydraulic motor and gear reduction means connected to said motor and adapted to be mounted on said housing covering said opening, said gear reduction means having a drive shaft adapted to extend into said housing through said opening for connection with said power take-off shaft whereby said traction elements may be driven by said motor when the transmission is disconnected from the engine.

13. An auxiliary drive unit adapted to be mounted on a motor vehicle of the type having an engine for driving a transmission for driving traction elements, said transmission including a housing having an opening therein and also including a power take-off shaft mounted within said housing in alignment with said opening, said drive unit comprising a hydraulic motor and gear reduction means connected to said motor and adapted to be mounted on said housing covering said opening, said gear reduction means including a driven shaft having a drive connection with said motor, a drive shaft adapted to extend into said housing through said opening for connection with said power take-off shaft, and a clutch for connecting said driven shaft with said drive shaft.

14. An auxiliary drive unit for a motor vehicle having an engine for driving a transmission for driving traction elements, said transmission including a power take-off shaft, said drive unit comprising a hydraulic motor, and gear reduction means adapted to be mounted on said vehicle and including change speed gearing of the type for changing the drive ratio between the driven and driving elements thereof, and a drive shaft driven by said motor through said change speed gearing and adapted to be connected to said power take-off shaft for driving said traction elements when the transmission is disconnected from the engine.

15. An auxiliary drive for a motor vehicle having an engine, a transmission including a driven element connectable with the engine and a driving element, said elements being interconnected by change speed gearing of the type for changing the drive ratio between the driven and driving elements, and traction elements driven by said driving element, said drive comprising means adapted to be driven by the engine for supplying power, a reversible motor connected to receive power from said means, and means for connecting said motor to said change speed gearing to drive said traction elements through said gearing in either direction when the transmission is disconnected from the engine.

16. An auxiliary drive for a motor vehicle having an engine, a transmission including a driven shaft connectable with the engine, a countershaft geared to said driven shaft, a drive shaft, and change speed gearing for selectively connecting said drive shaft with said countershaft and with said driven shaft, and traction elements driven by said drive shaft, said drive comprising pump means adapted to be driven by the engine for supplying fluid under pressure, a reversible fluid pressure motor connected to receive pressure fluid from said pump means, and means for connecting said motor to said countershaft whereby said traction elements may be driven forwardly or reversely through said change speed gearing when the transmission is disconnected from the engine.

17. An auxiliary drive for a motor vehicle having an engine, a transmission including a driven shaft connectable with the engine, a countershaft geared to said driven shaft, a drive shaft, and change speed gearing for selectively connecting said drive shaft with said countershaft and with said driven shaft, and traction elements driven by said drive shaft, said drive comprising pump means adapted to be driven by the engine for supplying fluid under pressure, a fluid pressure motor connected to receive pressure fluid from said pump means, a flow control valve interposed between said pump means and said motor to vary the flow of pressure fluid to said motor and thereby vary the speed of operation of the motor, and means for connecting said motor to said countershaft when the transmission is disconnected from the engine whereby said traction elements may be operated at variable speeds dependent upon the change speed gearing selected and the flow of pressure fluid to said motor as controlled by said flow control valve.

18. An auxiliary drive for a motor vehicle having an engine, a transmission including a driven shaft connectable with the engine, a countershaft geared to said driven shaft, a drive shaft, and change speed gearing for selectively connecting said drive shaft with said countershaft and with said driven shaft, and traction elements driven by said drive shaft, said drive comprising pump means adapted to be driven by the engine for supplying fluid under pressure, a reversible fluid, pressure motor connected to receive pressure fluid from said pump means, a flow control valve interposed between said pump means and said motor to vary the flow of pressure fluid to said motor and thereby vary the speed of operation of the motor, a reversing valve interposed between said flow control valve and said motor for effecting operation of the motor in opposite directions, and means for connecting said motor to said countershaft when the transmission is disconnected from the engine whereby said traction elements may be operated either forwardly or reversely under control of said reversing valve and at variable speeds dependent upon the change speed gearing selected and the flow of pressure fluid to said motor under control of said flow control valve.

19. In a tractor, ground-engaging propelling means; an engine; a change-speed transmission including a transmission shaft drivably connectable with said engine, a drive shaft drivingly connected with said propelling means, and means for driving the drive shaft from the transmission shaft at selectively different speeds; a creeper speed drive for the propelling means, comprising a hydraulic pump driven from the engine, a hydraulic motor, fluid transmission lines communicating between the pump and the motor for transmitting driving fluid from the pump to the motor, and driving means disconnectably establishable in driving relation between the motor and the transmission shaft; and means selectively establishable in driving relation between the engine and the transmission shaft independently of said creeper speed drive.

20. In a tractor, ground-engaging propelling means; an engine; a change-speed transmission including a transmission shaft drivably connectable with said engine, a drive shaft drivingly connected with said propelling means, and means for driving the drive shaft from the transmission shaft at selectively different speeds; a creeper speed drive for the propelling means, comprising a hydraulic pump driven from the engine, a hydraulic motor, fluid transmission lines communicating between the pump and the motor for transmitting driving fluid from the pump to the motor, means for driving the transmission shaft from the hydraulic motor, and valve means controlling flow of the fluid through said lines and adapted to divert such flow to interrupt drive of the motor by the pump; and means selectively establishable in driving relation between the engine and the transmission shaft independently of said creeper speed drive.

21. In a motor vehicle having an engine and a change speed gearing having connection with the engine and with traction elements of the motor vehicle, a clutch in said connection of the change speed gearing with the engine, a speed modifying mechanism connecting the engine with the change speed gearing to drive said traction elements through the change speed gearing at speeds modified by said speed modifying mechanism, and means for selectively rendering said connections between the engine and the change speed gearing alternately effective to drive the change speed gearing through the clutch in one instance and the speed modifying means in the other instance independently of the clutch.

22. In a motor vehicle having an engine, a change speed gearing having connection with traction elements of the motor vehicle and a clutch connecting the engine unit with the change speed gearing to effect direct drive of the traction elements through the change speed gearing in accordance with the operating speeds of the engine when said clutch is engaged, and a fluid pressure driving mechanism connecting the engine with the change speed gearing to modify said engine speeds as effected through the change speed gearing when the clutch is disengaged and the fluid pressure driving mechanism is effective.

23. In a motor vehicle having an engine, a change speed gearing having connection with traction elements of the motor vehicle and a clutch connecting the engine with the change speed gearing to effect direct drive of the traction elements through the change speed gearing in accordance with the operating speeds of the engine when said clutch is engaged, a fluid pressure driving mechanism including a fluid pump having a driven connection with the engine, a fluid pressure motor having a driving connection with the change speed gearing, fluid pressure duct means interconnecting the pump with the fluid pressure motor, and pressure fluid control means in said duct means to vary the speed of the fluid pressure motor for modifying the engine unit speeds transmitted through the change speed gearing upon disengagement of said clutch.

24. In a motor vehicle having an engine, a change speed gearing having connection with traction elements of the motor vehicle and a clutch connecting the engine with the change speed gearing to effect direct drive of the traction elements through the change speed gearing in accordance with the operating speeds of the engine when said clutch is engaged, a fluid pressure driving mechanism including a fluid pump having a driven connection with the engine, a fluid pressure motor having a driving connection with the change speed gearing, fluid pressure duct means interconnecting the pump with the fluid pressure motor, pressure fluid control means in said duct means to vary the speed of the fluid pressure motor for modifying the engine unit speeds transmitted through the change speed gearing upon disengagement of said clutch, and means interconnecting said duct means to reverse flow of pressure fluid to the pressure fluid motor for operating the change speed gearing in reverse by said fluid pressure motor.

25. In a motor vehicle having an engine for driving traction elements of the motor vehicle through a change speed gearing upon engagement of a clutch between the engine unit and the change speed gearing, a fluid pressure driving mechanism including a fluid pump having a driven connection with the engine unit, a fluid pressure motor having a driving connection with the change speed gearing, fluid pressure ducts interconnecting the pump with the fluid pressure motor, pressure fluid control means in said duct to vary the speed of the fluid pressure motor for modifying the engine speeds transmitted through the change speed gearing upon disengagement of said clutch, and a clutch in the driving connection between the pressure fluid motor and the change speed gearing adapted for alternate operation with the first named clutch.

26. In a motor vehicle having an engine and a change speed gearing having connection with traction elements of the motor vehicle and a clutch connecting the engine with the change speed gearing to effect direct drive of the traction elements through the change speed gearing in accordance with the operating speeds of the engine when said clutch is engaged, a fluid pressure driving mechanism including a fluid pump having a driven connection with the engine, a fluid pressure motor having a driving connection with the change speed gearing, fluid pressure ducts interconnecting the pump with the fluid pressure motor, pressure fluid control means in said duct to vary the speed of the fluid pressure motor for modifying the engine speeds as transmitted through the change speed gearing after disengagement of said clutch, a clutch in the driving connection between the pressure fluid motor and the change speed gearing adapted for alternate operation with the first named clutch, and valve means in said duct for reversing flow of the pressure fluid to reverse operation of the fluid pressure motor to drive the change speed gearing in reverse by said fluid pressure motor.

27. In a motor vehicle having an engine, a change speed gearing having connection with traction elements of the motor vehicle for driving the traction elements through a plurality of different gear ratios and a clutch connecting the engine with the change speed gearing to effect drive of the traction elements through the change speed gearing with said different gear ratios in accordance with the operating speeds of the engine when said clutch is engaged, a fluid pressure driving mechanism including a fluid pump having a driven connection with the engine, a fluid pressure motor having a driving connection with the change speed gearing for driving the traction elements through the different gear ratios, fluid pressure ducts interconnecting the pump with the fluid pressure motor, and a bypass flow control valve in said ducts for controlling the flow volume of fluid to the pressure fluid motor for variably modifying the speed effect of the different gear ratios of the change speed gearing.

28. An apparatus including a change speed gearing having a transmission shaft in connection with a mechanism to be operated and having a countershaft connected with the transmission shaft by a plurality of gear sets, an engine, and a fluid pressure driving mechanism connecting the engine with the countershaft of the change speed gearing to actuate the operated mechanism when any one of the gear sets is effective.

29. An apparatus including a change speed gearing having a transmission shaft in connection with a mechanism to be operated and having a countershaft connected with the transmission shaft through a plurality of gear sets, an engine, and a fluid pressure driving mechanism connecting the engine with the countershaft of the change speed gearing, said fluid pressure driving mechanism including means for reversing operation of the countershaft of the change speed gearing to reverse direction of said operated mechanism when the fluid pressure driving mechanism is in operation.

30. An apparatus including a change speed gearing having a transmission shaft in connection with a mechanism to be operated and having a countershaft connected with the transmission shaft through a plurality of gear sets, an engine, and a variable speed fluid pressure driving mechanism connecting the engine with the countershaft of the change speed gearing to actuate the operated mechanism when any one of the gear sets is effective.

31. In a motor vehicle having an engine, a change speed gearing having a transmission shaft in connection with traction elements of the motor vehicle and having a countershaft connected with the transmission shaft through a plurality of change speed gear sets, a clutch connecting the engine with the change speed gearing to effect direct drive of the traction elements through the change speed gear sets in accordance with the operating speeds of the engine when said clutch is engaged, a fluid pressure driving mechanism, and a clutch connecting the fluid pressure mechanism with the countershaft of the change speed gearing to drive said traction elements through the change speed gearing sets when the first named clutch is disengaged and the second named clutch is engaged.

32. In a motor vehicle having an engine, a change speed gearing having a transmission shaft in connection with traction elements of the motor vehicle and having a countershaft connected with the transmission shaft through a plurality of change speed gear sets, a clutch connecting the engine with the change speed gearing to effect direct drive of the traction elements through the change speed gear sets in accordance with the operating speeds of the engine when said clutch is engaged, a variable speed fluid pressure driving mechanism, and a clutch connecting the fluid pressure mechanism with the countershaft of the change speed gearing to drive said traction elements through the change speed gearing at different speeds when the first named clutch is disengaged and the second named clutch is engaged.

33. In a motor vehicle having an engine and a change speed gearing having connection with the engine and with traction elements of the motor vehicle for driving the traction elements through a plurality of different gear ratios, a fluid pressure driving mechanism connecting the engine with the change speed gearing to drive said traction elements through the different gear ratios of the change speed gearing at speeds modified by the fluid pressure driving mechanism, and means for selectively rendering said connections between the engine and the change speed gearing alternately effective.

References Cited in the file of this patent

UNITED STATES PATENTS 1,633,814     Jones _________________ June 28, 1927

(Other references on following page)

UNITED STATES PATENTS

| | | |
|---|---|---|
| 1,951,089 | Fielder | Mar. 13, 1934 |
| 1,963,091 | Jenkins | June 19, 1934 |
| 1,992,210 | Higley | Feb. 26, 1935 |
| 2,223,002 | Ferguson | Nov. 26, 1940 |
| 2,263,779 | Jeffrey et al. | Nov. 25, 1941 |
| 2,314,511 | Ormsby | Mar. 23, 1943 |
| 2,325,729 | Allin | Aug. 3, 1943 |
| 2,384,447 | Baldwin et al. | Sept. 11, 1945 |
| 2,468,828 | Kopp | May 3, 1949 |
| 2,530,720 | Paulson | Nov. 21, 1950 |
| 2,544,606 | Mallory | Mar. 6, 1951 |
| 2,689,621 | Donley | Sept. 21, 1954 |
| 2,708,800 | Logus | May 24, 1955 |